United States Patent [19]
Plunkett et al.

[11] 4,044,284
[45] Aug. 23, 1977

[54] ALTERNATING CURRENT MOTOR CONTROL METHOD AND SYSTEM

[75] Inventors: Allan Barr Plunkett; John Douglas D'Atre, both of Erie, Pa.

[73] Assignee: General Electric Company, Erie, Pa.

[21] Appl. No.: 605,847

[22] Filed: Aug. 19, 1975

[51] Int. Cl.² .......................................... H02P 5/40
[52] U.S. Cl. .................... 318/227; 318/230; 318/231
[58] Field of Search ............... 318/227, 230, 231

[56] References Cited
U.S. PATENT DOCUMENTS

| | | | |
|---|---|---|---|
| 3,500,158 | 3/1970 | Landau et al. | 318/227 |
| 3,512,067 | 5/1970 | Landau | 318/231 X |
| 3,593,083 | 7/1971 | Blaschke | 318/227 |
| 3,700,986 | 10/1972 | Cushman et al. | 318/231 X |
| 3,796,935 | 3/1974 | Blaschke | 318/231 X |
| 3,805,135 | 4/1974 | Blaschke | 318/231 X |
| 3,824,437 | 7/1974 | Blaschke | 318/231 X |

*Primary Examiner*—Gene Z. Rubinson
*Attorney, Agent, or Firm*—A. S. Richardson, Jr.

[57] ABSTRACT

A new and improved motor control method and system wherein the frequency of the rotating electro-magnetic flux produced in an alternating current machine, is sensed and compared to a desired value of machine flux frequency to derive an output error control signal. The output error control signal is then applied to control the frequency of the alternating current supplied to the machine in a direction and by an amount necessary to zero any difference in the sensed frequency and the desired frequency of machine flux. In preferred embodiments the actual value of the electromagnetic flux produced across the rotor-stator gap of the motor, is sensed and used as the controlling criterion in the motor control system. The magnitude of the alternating current supplied to the motor is separately controlled in accordance with some other predetermined motor operating characteristics such as motor torque, load current, etc.

30 Claims, 5 Drawing Figures

ALTERNATING CURRENT MOTOR CONTROL METHOD AND SYSTEM

BACKGROUND OF THE INVENTION

1. Field of Invention

This invention relates to a new and improved method and apparatus for controlling alternating current machines of the synchronous and asynchronous type.

More specifically, the invention relates to a control method and system for reliably controlling the operation of induction motors by closely and effectively controlling the frequency of the rotating electro-magnetic flux produced by the machine while also separately controlling the magnitude.

2. Background Problem

In alternating current machines such as a squirrel cage induction motor, the lack of electrical connection to the rotor prevents direct control of the electrical condition occurring in the rotor. Consequently, the electrical conditions of the rotor can be controlled only indirectly by controlling the nature of the alternating current supplied to the stator of the machine. Known motor control systems for machines of this type generally stabilize operation of the system by using voltage control, and then do a variety of different things with other motor operating characteristics such as the slip frequency. Thus, with known control systems voltage control is employed as the prime stabilizing criterion while frequency normally is considered in a slave or secondary channel of control.

For improved stability in a motor control system, the best way to achieve it is through control of the motor flux. It is known that the electromagnetic flux produced across the stator-rotor gap of alternating current motor is determined primarily by the magnitude and frequency of the alternating current supplied to the stator and the reaction of the rotor. However, what is important is the frequency of the rotating electro-magnetic flux produced across the stator-rotor gap of this machine. This may not always correspond to the frequency of the driving alternating current supplied to the stator of the machine in a system where a current source is employed to supply the motor. If the stator frequency of a current fed induction motor were rapidly changed, the motor will act as a synchronous motor during the resulting transient, i.e. the rotor speed dominates flux and the developed voltage (back emf) may not be synchronized with the current which is controlled by the inverter switching frequency. Therefore a change in the frequency of the supply alternating current (that is the frequency of the current supplied to the stator windings of the motor) may transiently result in generating a rotating electromagnetic flux frequency that is different from the frequency of the supply alternating current, and actually may push power out of the motor even though the motor should not be operating in the generator mode. As a consequence, the alternating current supply cannot necessarily set the frequency of the electromagnetic flux produced in the machine.

The above observed phenomenon does not mean that one cannot build a system that would stabilize the motor, and which uses frequency as a controlling criterion. However, if one is to build a stable control system while using frequency as a controlling criterion, the frequency that should be used is the frequency of the actual electromagnetic flux produced across the stator-rotor gap of the motor because that is the active frequency affecting the operation of the motor.

SUMMARY OF INVENTION

It is therefore a primary object of the present invention to provide a new and improved alternating current motor control method and system for appropriately controlling the input frequency of the alternating current supplied to an alternating current induction motor so as to obtain a desired rotating electromagentic flux frequency within the motor.

Another object of the invention is to provide a new motor control method and system having the above characteristics and wherein the magnitude of the alternating current supplied to the motor, and hence to a certain extent the magnitude of the electromagnetic flux produced in the motor, is separately controlled in response to some operating characteristic of the motor other than flux frequency, such as motor torque, load current, etc.

In practicing the invention, a new and improved motor control method and system is provided within the frequency of the rotating electromagnetic flux produced in the alternating current machine, is sensed, compared to a desired value of machine flux frequency, and the frequency of the alternating current supplied to the machine is then adjusted in a direction and by an amonunt to zero any difference in the two values. In a preferred embodiment of the invention, the actual value of the frequency of the electromagnetic flux produced across the rotor-stator gap of the motor, is sensed and used as the controlling criterion in the motor control system. The magnitude of the alternating current supplied to the motor then is separately controlled in accordance with some other predetermined criterion such as motor torque, load current, etc.

These and other objects, features, and many of the attendant advantages of this invention will be appreciated more readily as the same becomes better understood by reference to the following detailed description, when considered in connection with the accompanying drawings, wherein like parts in each of the several Figures are identified by the same reference character, and wherein:

DETAILED DESCRIPTION OF PREFERRED EMBODIMENTS

Figure 1:
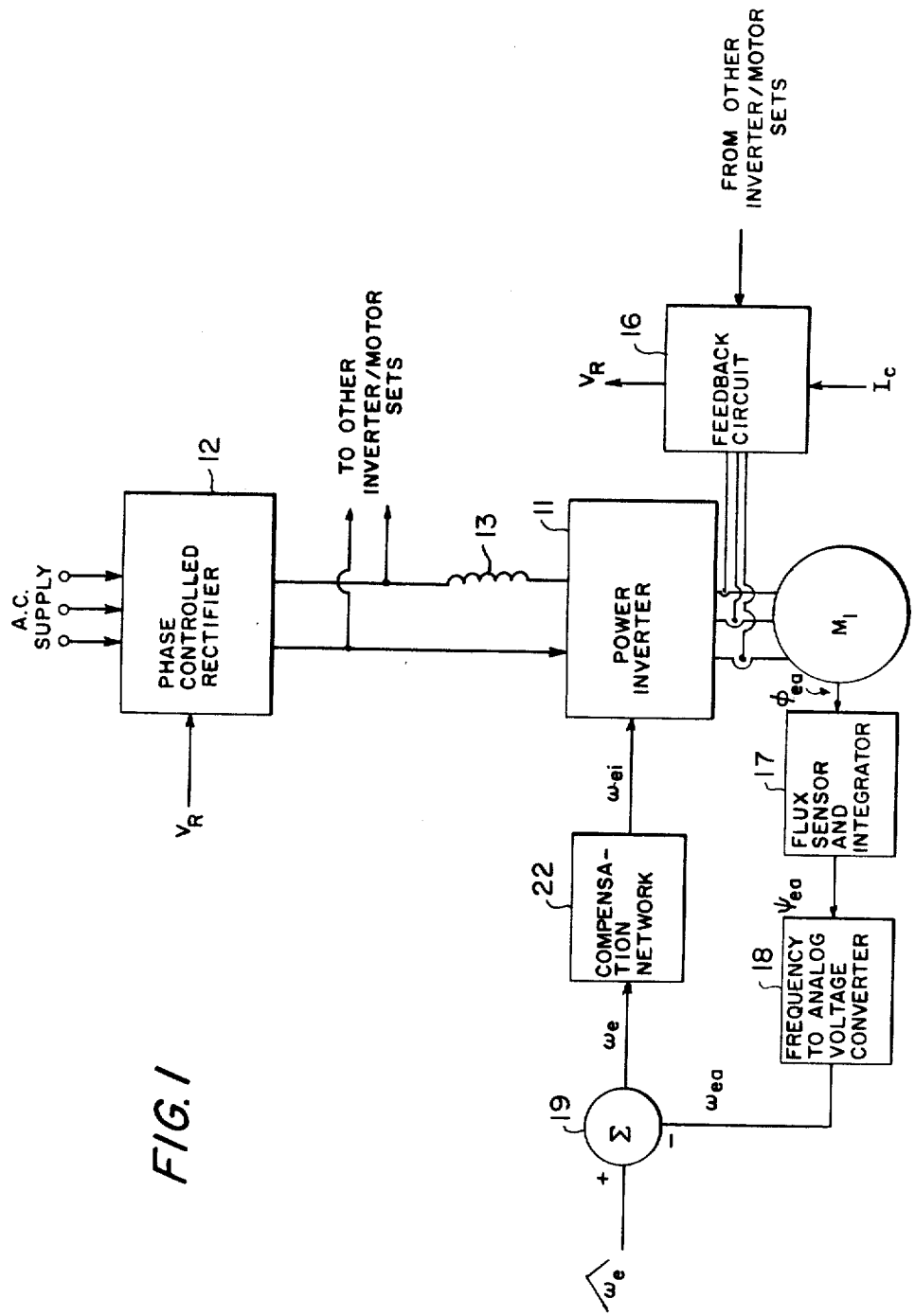
FIG. 1 is a functional block diagram of a new and improved induction motor control system constructed in accordance with the invention.

FIG. 1 is a schematic, functional block diagram of a variable speed, induction motor drive system according to the invention wherein a conventional, three-phase, squirrel cage alternating current induction motor is shown at $M_1$. The induction motor $M_1$ maybe of any conventional, commercially available construction and may be driven separately or connected in an overall motor drive system with a plurality of additional, similar induction motors (not shown). While the invention herein described is intended primarily for use in a variable speed drive system, it is to be understood that the application of the invention is in no way restricted to use with variable speed motor drive systems, but can be used with constant speed motor drive systems for controlling the operation of a single motor, or it can be used in conjunction with a common source of controlled magnitude direct current in multiple drive systems of either the variable speed or constant speed type. The manner in which the system of FIG. 1, as well as those shown in FIGS. 2 through 4, would be included in a plural motor drive system, is disclosed more fully in our copending U.S. application Ser. No. 605,848 filed concurrently with this application, and entitled "Method and Apparatus for Controlling Variable Speed, Controlled Current Induction Motor Drive Systems" assigned to the General Electric Co. Copending application Ser. No. 605,848 is directed to a new and improved motor control system which employs the magnitude of the rotating electro-magnetic flux produced across the stator-rotor gap in an alternating current machine of the asynchronous type, as the primary controlling criterion. To the extent compatible and necessary, the disclosure of that application is hereby expressly incorporated in this specification by reference for the purpose of further enabling the present disclosure.

The induction motor $M_1$ has its stator winding excited from the output of power conversion circuit means which is energized in turn by an available source of electric power. As is illustrated in FIG. 1, the power conversion circuit means includes, for each motor in the drive system, a power inverter 11 which, if desired, may comprise any known, conventional, commercially available power inverter such as those described in the textbook entitled, "Principles of Inverter Circuits" — by B. D. Bedford of R. G. Hoft and published by John Wiley and Sons, Inc. 1964 —Library of Congress, catalogue card No. 64-20078. In practicing the present invention, however, it is preferred to employ an auto-sequential commutated, controlled current inverter as the power inverter 11 in all embodiments of the invention as herein described. One suitable form of a known, auto-sequential commutated controlled current inverter is described with relation to FIG. 6 of the drawings of the above noted copending application serial No. 605,848, as well as in copending U.S. Pat. No. 3,980,941 filed June 18, 1975, entitled "Improved Auto-Sequential Commutated Inverter Having Improved Reset Circuit" — R. Griebel, inventor, and assigned to the General Electric Company.

The power inverter 11 is supplied from the output from the front end section of the power conversion circuit means. If the available source of power were in the form of direct current, this section would comprise a chopper of known design. Alternatively, if the source is an alternating current supply, a phase controlled rectifier circuit 12 can be used, as is indicated in FIG. 1. The phase controlled rectifier 12 is of conventional construction and may be of the type described in the above noted Bedford and Hoft textbook or in the General Electric SCR Manual, Fifth Edition, published by the Semi-conductor Products Department of the General Eelctric Company, Syracuse, New York. Phase controlled rectifier 12 is designed to apply a direct voltage of variable magnitude to a direct current bus to which the d-c terminals of the power inverter 11, as well as those of a plurality of other inverter/motor sets in parallel, are separately connected thru a current smoothing inductor or choke 13. Accordingly, the common phase controlled rectifier 12 must be appropriately rated for the number of inverter/motor sets being supplied. Each inverter/motor set is connected to the output of the common phase controlled rectifier 12 thru its own dc link inductor such as 13. The dc link inductors reduce the ripple in the dc link current supplied from the common phase controlled rectifier 12 to the separate, parallel connected inverter/motor sets, and prevent interaction of the several power inverters on each other and on the phase controlled rectifier 12 by substantially filtering out any line or motor frequency current that might otherwise appear on the direct current supply conductors.

In the system of FIG. 1, as thus far described, the common phase controlled rectifier 12 serves to supply controlled magnitude direct current to the power inverter 11 of each inverter/motor set. Power inverter 11 then functions to convert the direct current to an alternating current of a desired frequency for supply to the induction motor $M_1$ in a variable speed drive system. The magnitude of the alternating current supplied to motor $M_1$ can be controlled by retarding or advancing the "firing angle" of the controllable electric valves in the phase controlled rectifier circuit 12, and the frequency of this current can be controlled by appropriately varying the switching frequency of the controllable electric valves in the inverter 11. These controls are respectively exercised as functions of interdependent command signals developed by an operator controlled command logic module (not shown) such as is described in our copending application Ser. No. 605,848. From one of these command signals there is derived a suitable control signal such as $\omega_e^*$ which represents the desired value of stator excitation frequency in the motor $M_1$. In the system of FIG. 1, similar to the arrangements described in copending application Ser. No. 605,848, flux magnitude can be employed as the regulating criterion for operation of the overall control system around a set point determined by the input to the command logic module. The operator will set the system to drive the motor in a desired manner, and the frequency feedback channel thereafter will regulate operation of the system in the manner hereafter described to assure stable operation of the system around any set operating point established by the operator within the constraints of the system's design.

In the system of FIG. 1, a feedback signal $\omega_{ea}$ representative of the frequency of the rotating electro-magnetic flux produced across the stator-rotor air gap of induction motor $M_1$ is derived by means of suitable flux sensing and integrating means 17 and a frequency to analog voltage converter 18. The flux sensor and integrator circuits 17 may correspond to circuits described more fully in U.S. application Ser. No. 568,120 filed Apr. 14, 1975 - entitled "Torque Regulating Induction Motor Control Systems" by A. B. Plunkett, inventor, assigned to the General Electric Company, and in particular with respect to FIG. 4 and 5 thereof, and in copending U.S. application Ser. No. 525,613; filed Nov. 20, 1974, entitled "Apparatus For Regulating Magnetic Flux in An AC Motor", A. B. Plunkett, and J. P. Franz, co-inventors, assigned to the General Electric Company, the disclosure of which is hereby incorporated in its entirety. For the purpose of this disclosure, it is sufficient to state that the flux sensor 17 is comprised by a plurality of sensing coils each of which sense the actual electromagnetic flux $\phi_{ea}$ produced in the air gap between the respective sets of rotor-stator phase windings with which each sensing coil is related. The sensing coils derive output voltage signals that are proportional to the rate of change of flux across the rotor-stator air gap, and these signals are integrated in suitable integrating circuits to derive a flux output signal $\psi_{ea}$. For the purpose of the present control, the output of any one of the phase winding sensors can be employed, for example the phase A winding sensor, to develop the output signal $\psi_{ea}$. This output signal is supplied to a frequency to analog voltage converter circuit 18, a preferred form of which will be described more fully hereinafter in connection with FIG. 5 of the drawings. The frequency to analog voltage converter 18 converts the essentially alternating current, flux representative signal $\psi_{ea}$ supplied from flux frequency sensor and integrator 17 into an analog voltage $\omega_{ea}$ which is representative of the frequency of rotation of the electromagnetic flux produced across the stator-rotor gap of induction motor $M_1$.

The feedback analog voltage signal $\omega_{ea}$ is supplied as one input to a conventional summing circuit 19 along with an input signal $\hat{\omega}_e$. Input signal $\hat{\omega}_e$ constitutes an input command value of machine flux frequency signal which is representative of a desired value of frequency for the rotating electromagnetic flux produced in motor $M_1$ for the operating conditions set for motor $M_1$ by an operator of the system. It is understood that the input command value of machine flux frequency signal $\hat{\omega}_e$ will of course by different for different operating conditions of motor $M_1$ as called for by the operator's input command logic module discussed earlier and described more fully in copending U.S. application Ser. No. 605,848.

Summing circuit 19 combines the analog voltage feedback signal $\omega_{ea}$ obtained from the output of frequency to analog voltage converter 18 with the input command value of machine flux frequency signal $\hat{\omega}_e$, and derives an output error control signal which is representative of the polarity and magnitude of any difference between the command value of machine flux frequency and the sensed or measured value of machine flux frequency represented by the analog voltage feedback signal $\omega_{ea}$. The resultant output error control signal $\omega_e$ is then supplied through a conventional compensation network 22 for providing a gain plus appropriate lead/lag compensation to the error control signal and to provide at its output a suitable frequency controlling signal $\omega_{ei}$ for application to the frequency determining gating circuits controlling power inverter 11 to control the frequency of the alternating current supplied to motor $M_1$ by power inverter 11. The frequency determining gating circuits controlling the frequency of operation of power inverter 11 are entirely conventional in construction and have not been described since suitable gating circuits for this function are described in the above referenced Bedford and Hoft textbook and the General Electric SCR Manual as well as other texts.

In addition to the above described components, a preferred control system according to the invention will further include a closed loop regulating scheme for controlling the average magnitude of the voltage output of the phase controlled rectifier 12 in a known manner to minimize an error control signal $V_R$ representative of the difference between actual and desired values of a selected parameter of the inverter/motor sets. Sensed values of the selected parameter, which is illustrated as the magnitude of current flowing in the stator windings of the respective motors of the inverter/motor sets but which could instead be torque or some other operating characteristics of the motors, are supplied to a feedback circuit 16 in which the average value of the individual feedbacks is compared with a command signal $I_c$ to derive the error signal $V_R$. The command signal $I_c$ originates in the earlier mentioned operator controlled command logic module (not shown), and it will be related to the desired flux frequency signal $\hat{\omega}_e$ for the operating conditions of the motor then existing. The feedback circuit 16 can be constructed and arranged in the manner described more fully in the above referenced copending U.S. Ser. No. 605,848.

In operation, the magnitude of the alternating current supplied by power inverter 11 to the stator windings of induction motor $M_1$ depends on the magnitude of the output voltage of the phase controlled rectifier 12. The power inverter 11, in response to the frequency controlling input signal $\omega_{ei}$ determines the switching rate and hence the frequency of the alternating current power supplied to induction motor $M_1$ by powerinverter 11. The phase controlled rectifier output voltage remains relatively fixed for a commanded operating condition for motor $M_1$, and is not in the primary regulating feedback channel used to achieve stabilization of system operation. System stabilization is achieved primarily with the frequency controlling channel; however, the switching frequency of the current wave form supplied by inverter 11 can deviate transiently from the frequency of the rotating electromagnetic motor flux.

The system shown in FIG. 1 provides for appropriate switching of the power inverter 11 by frequency controlling input signal $\omega_{ei}$ in a manner such that the desired frequency of the rotating electromagnetic stator flux is achieved regardless of whether the phase controlled rectifier is operating in a saturated condition or not. Consequently, the frequency command $\hat{\omega}_e$ sets the frequency of the motor flux and therefore is available as a controlling and stabilizing force in the system. As stated above, the usefulness of current fed inverters is impaired by transient discrepancies between the supply alternating current frequency and the actual rotating electromagnetic flux frequency of the motor. This condition is particularly troublesome where the phase controlled rectifier is not used for stabilizing operation of the motor control system. In such systems, inability of the power inverter alternating current frequency to set a corresponding rotating electromagnetic flux frequency for the motors, can result in unstable system operation where frequency is employed as a primary controlling criterion in the system. The solution to this problem is overcome by the present invention wherein the applied alternating current frequency of the current supplied by power inverter 11 to motor $M_1$, is specifically controlled or regulated so as to achieve a desired effective rotating electromagnetic flux frequency in the motor. In this system, a signal $\psi_{ea}$ is derived which is indicative of the motor's rotating electromagnetic flux appearing across the rotor-stator air gap of the motor. This signal is converted by frequency to analog converter 18 to a variable magnitude direct current analog signal $\omega_{ea}$ representative of the rotating electromagnetic flux frequency. The analog feedback signal $\omega_{ea}$ then is compared with the commanded motor flux frequency signal $\hat{\omega}_e$ to form an error signal $\omega_e$ indicative of any difference in the commanded and actual motor flux frequency. This error signal then is compensated and forms the current switching frequency command signal $\omega_{ei}$ that is supplied to the auto-sequential commutated controlled current inverter 11 as a frequency controlling signal. In this manner, the switching frequency of the inverter is set to whatever value is required to obtain an actual rotating electromagnetic flux frequency in motor $M_1$ corresponding to that of the commanded value $\hat{\omega}_e$.

Figure 2:
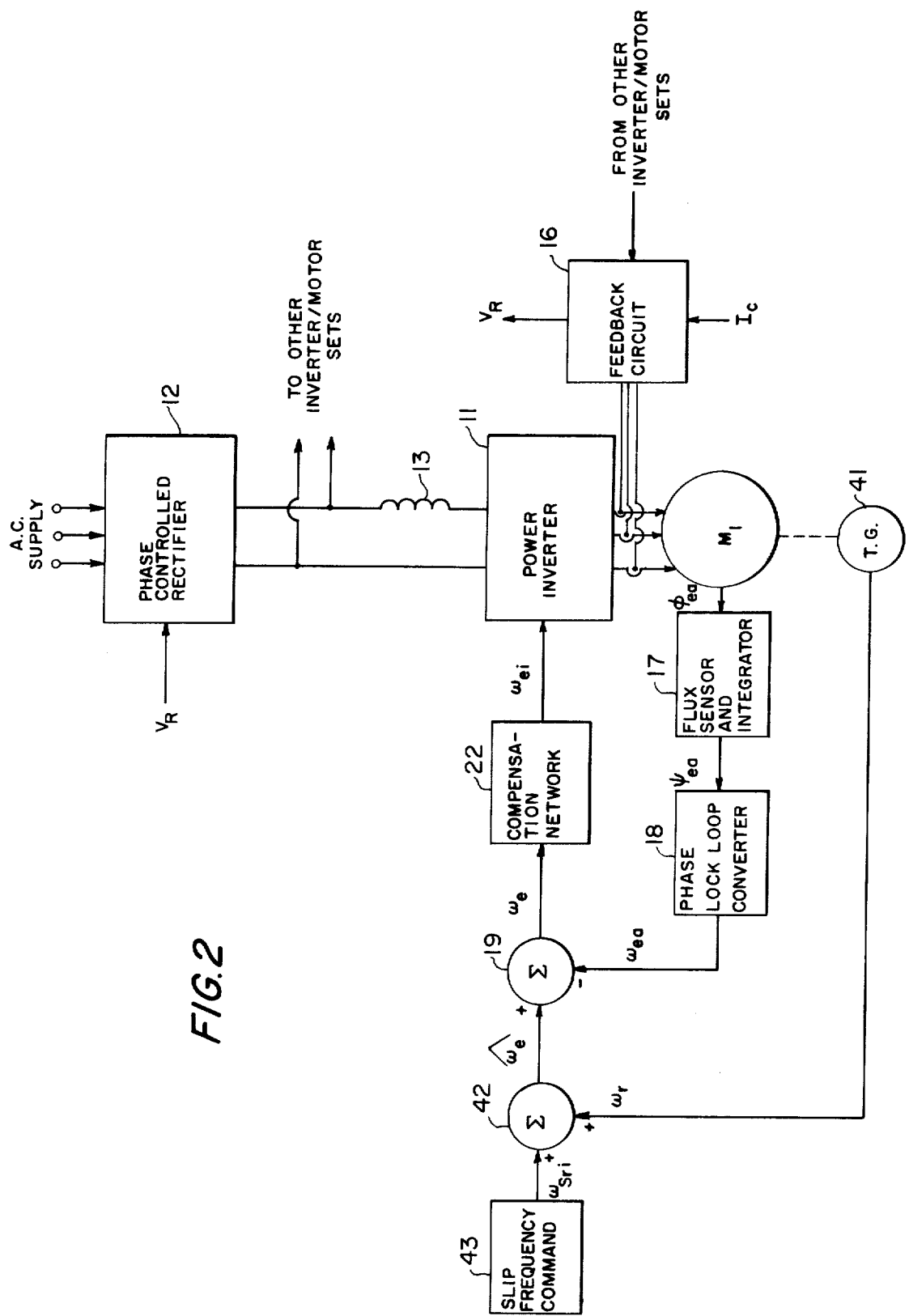
FIG. 2 is a functional block diagram of a preferred form of the control system wherein the speed of the motor is sensed and summed with an input command value of slip frequency to provide an additional feedback control channel to further enhance operation of the system.
Figure 5:
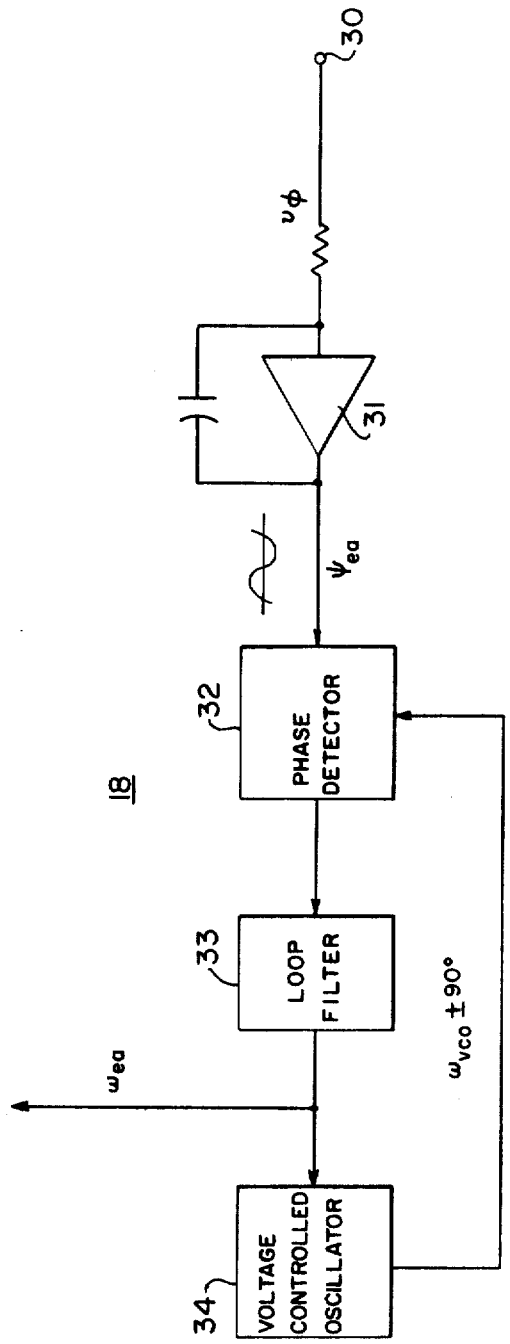
FIG. 5 is a functional block diagram of a preferred form of phase lock-loop converter employed in the systems of the invention shown in FIGS. 2 through 4.

FIG. 2 is a schematic, functional block diagram of a preferred form of the invention and includes many of the elements of the system described with relation to FIG. 1. In the embodiment of the invention shown in FIG. 2, the frequency to analog voltage converter 18 is comprised by a phase lock-loop converter. A preferred form of phase lock-loop converter for use as the element 18 in either FIG. 1 or FIG. 2, is illustrated in FIG. 5 of the drawings. In FIG. 5, terminal 30 is supplied with an input signal $V_\phi$ derived from a flux sensing winding or other device responsive to the actual electromagnetic flux $\phi_{ea}$ produced across the stator-rotor gap of the motor. This input signal $V_\phi$ is integrated in an integrating circuit comprised by an operational amplifier 31 having a capacitor connected in its feedback path. Integrating circuit 31 provides at its output an essentially sinusoidal motor flux signal $\psi_{ea}$ which is representative of the rotating electromagnetic flux produced in motor $M_1$. The signal $\psi_{ea}$ is supplied as one of the inputs to a phase detector 32 of conventional construction. Phase detector 32 has a second input supplied from the output of a voltage controlled oscillator 34. Voltage controlled oscillator 34 is designed to provide an output signal $\omega_{vco} \pm 90°$ having a frequency substantially equal to the frequency of the rotating electromagnetic flux of motor $M_1$ but shifted in phase + or $-90°$. Phase detector 32 compares the phase of the rotating electromagnetic flux signal $\psi_{ea}$ to the phase of the voltage controlled oscillator signal $\omega_{vco} \pm 90°$ and derives at its output an error signal representative of the difference in phase of the two signals. By reason of the 90° phase shift, when the two frequencies correspond, the output signal from phase detector 32 will be zero and the voltage controlled oscillator 34 will be tracking precisely the frequency of the rotating electromagnetic flux in motor $M_1$. A loop filter 33 is introduced between the output of phase detector 32 and the input of voltage controlled oscillator 34 to provide loop stabilization. The analog voltage feedback signal $\omega_{ea}$ is obtained from the output of the loop filter 33 and is supplied to one input of summing circuit 19 in the manner best seen in FIG. 2 of the drawings.

In addition to the above-described stabilization achieved by sensing and feeding back the frequency of the rotating electromagnetic flux in motor $M_1$, another feedback channel is provided for sensing the speed of motor $M_1$ so that the input command represents motor slip frequency rather than stator excitation frequency and thus makes the control system insensitive to speed changes. The speed feedback signal is derived by a tachometer generator 41 or other similar speed sensing device for sensing the speed of rotation of the rotor of motor $M_1$. Tachometer generator 41 has its output supplied as one input to an additional summing circuit 42. Summing circuit 42 is supplied from a slip frequency command circuit 43 with a command value of slip frequency $\omega_{sli}$ that is representative of a desired value of slip frequency to be produced in motor $M_1$ for a given operating condition of the motor as called for by an operator of the system. The latter signal can be advantageously derived from a flux magnitude regulating loop as is disclosed in our concurrently filed application previously cited. The additional summing circuit 42 adds the slip frequency signal $\omega_{sli}$ to the actual speed of rotor signal $\omega_r$ and develops at its output the command value of rotating electromagnetic flus frequency $\hat{\omega}_e$ that is supplied as one input to summing circuit 19.

To complete the system, a current control feedback circuit 16 is provided for developing the error signal $V_R$ for controlling operation of the phase controlled rectifier 12 and hence the magnitude of the current supplied to all of the inverter/motor sets in common. The signal $V_R$ will cause the average magnitude of current fed to the inverter/motor sets of the system to correspond substantially to that set by the input current command signal $I_c$ supplied from the operator controlled command logic module which develops appropriately related current control and slip frequency command signals $I_c$ and $\omega_{sli}$ for a desired operating condition of the inverter/motor sets.

In operation the system of FIG. 2 functions in the following manner. Assuming a condition where the drive system including motor $M_1$ has been operating in a predetermined manner previously set by an operator of the system and that thereafter the operator suddenly changes the condition called for such as by introducing a demand for increased torque. Under such circumstances the slip frequency command signal $\omega_{sli}$ would immediately increase. The signal $\hat{\omega}_e$ would increase and since the motor cannot instantaneously respond, $\omega_{ea}$ remains substantially the same and an error signal $\omega_e$ is developed. This signal is amplified appropriately by the compensation network to rapidly change the inverter switching frequency. The result is to quickly advance or retard the phase of the firing of the inverter with respect to the motor air gap flux. As the resultant air gap flux frequency changes to follow the command, $\omega_{ea}$ will change to null the error signal $\omega_e$, thereby allowing the system to stabilize its operation around the newly set condition of operation. The action of the flux frequency feedback loop is to rapidly change the inverter firing so that the command flux frequency $\hat{\omega}_e$ is quickly obtained thus improving the system response time. Concurrently with this regulating action, the slower responding current control feedback circuit 16 will, to the extent possible, increase the output voltage from the phase controlled rectifier 12 or other suitable power conversion device to increase motor current so as to satisfy the increased torque requirement called for by the operator of the system. Even if the rectifier were already fully on and hence cannot regulate current, the system will not become unstable because rectifier control is not essential to system stability with our control strategy.

Figure 3:
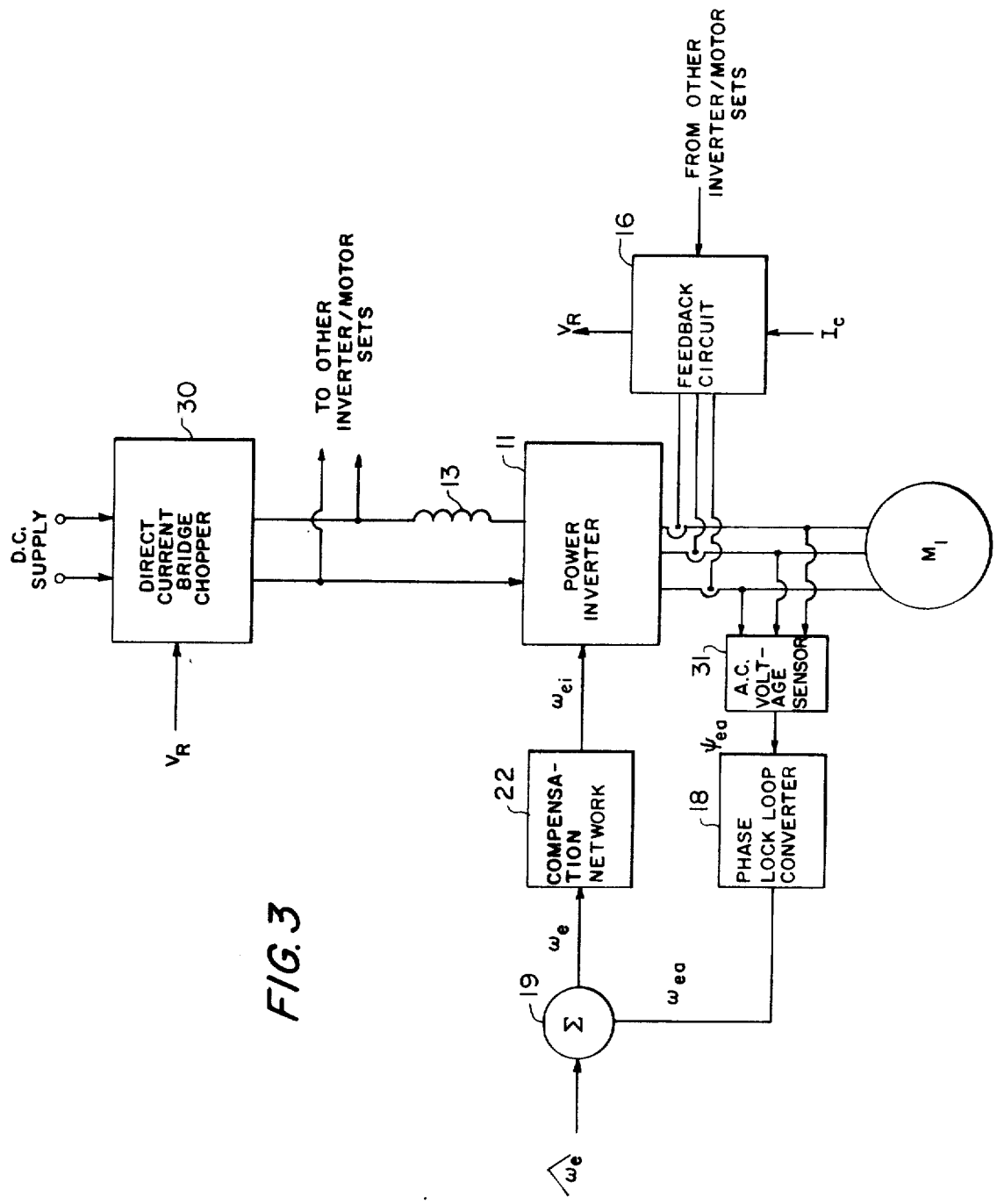
FIG. 3 is a functional block diagram of a modified form of control system according to the invention, and wherein the frequency of the alternating voltage appearing across the stator of the induction motor is sensed and used as a measure of the frequency of the rotating electromagnetic flux produced in the motor.

FIG. 3 is a functional block diagram of a modified form of the invention which employs a different kind of controlled magnitude direct current source for the power inverter 11. In addition, the species of the invention shown in FIG. 3 is intended for use in controlling induction motor which for one reason or another do not have built in motor flux sensing coils in the same manner as the motors described with respect to FIGS. 1 and 2 of the drawings. Thus, the system of FIG. 3, as well as that of FIG. 4 to be described hereinafter, may be used with existing induction motor drive systems without requiring that the induction motors be replaced or redesigned to include motor flux sensing coils.

In the system of FIG. 3, the induction motor $M_1$, as well as other motors of the overall drive system (not shown), is supplied from its own autosequential commutated, controlled current power inverter 11 in the same manner as the species of the invention shown in FIGS. 1 and 2. The power inverter 11 in turn is supplied from a common, controlled magnitude direct current source through the link inductor 13 along with other inverter/motor sets of the system. The controlled magnitude direct current source in the FIG. 3 system preferably comprises a direct current chopper of known design, such as those described in Chapter 13 of the above-noted General Electric SCR Manual. In certain applications, a direct current chopper 30 is useful as the source of controlled magnitude direct current supplied through link inductor 13 to the power inverter 11, as where the system is intended to operate during emergency periods when, perhaps due to failure of alternating current power, reserve batteries are employed to power the induction motor $M_1$. In the system of FIG. 3, the direct current chopper 30 is connected to a direct current source of electric energy, and it functions to provide direct current of desired magnitude to the power inverter 11 under the control of the error signal $V_R$.

In addition to the above discussed difference, the system of FIG. 3 is designed to employ an alternating voltage sensor 31 which is connected to sense the actual alternating voltage appearing across the stator windings of the induction motor $M_1$ and to develop the stator A.C. voltage frequency signal $\psi_{ea}$. To a considerable measure, the frequency of the stator voltage will correspond to the frequency of the rotating electromagnetic flux of the induction motor, and for the most part it can be said to constitute an indication or representation of the frequency of the rotating electromagnetic flux in the motor. This sensed replica of the frequency of the rotating electromagnetic flux of the motor is not as accurate a reproduction as that obtained with the species of the invention shown in FIGS. 1 and 2. However, it nevertheless is sufficiently representative to function adequately as a feedback control criterion except perhaps at low speeds or in the presence of high ripple currents in the DC link. This is due to the fact that at low speed, the voltage developed by the motor is caused by resistance drop and does not represent back emf due to flux. The sensed stator AC voltage feedback signal $\psi_{ea}$ is supplied to the phase lock loop converter 18 to derive the feedback analog voltage $\omega_{ea}$ for supply to summing circuit 19 in the same manner as was described with respect to the system shown in FIG. 2. In all other respects, the system of FIG. 3 is similar to and will function in a comparable manner to the system described previously with respect to FIGS. 1 and 2 of the drawings. As noted above, where it is desired to retrofit an older induction motor which has not had designed into it a suitable motor flux sensing coil arrangement such as that described with relation to the motors used in the FIG. 1 and FIG. 2 systems, then the system of FIG. 3 would be much easier and less costly to employ since it would not require reworking of the motor stator to introduce suitable flux sensing coils.

Figure 4:
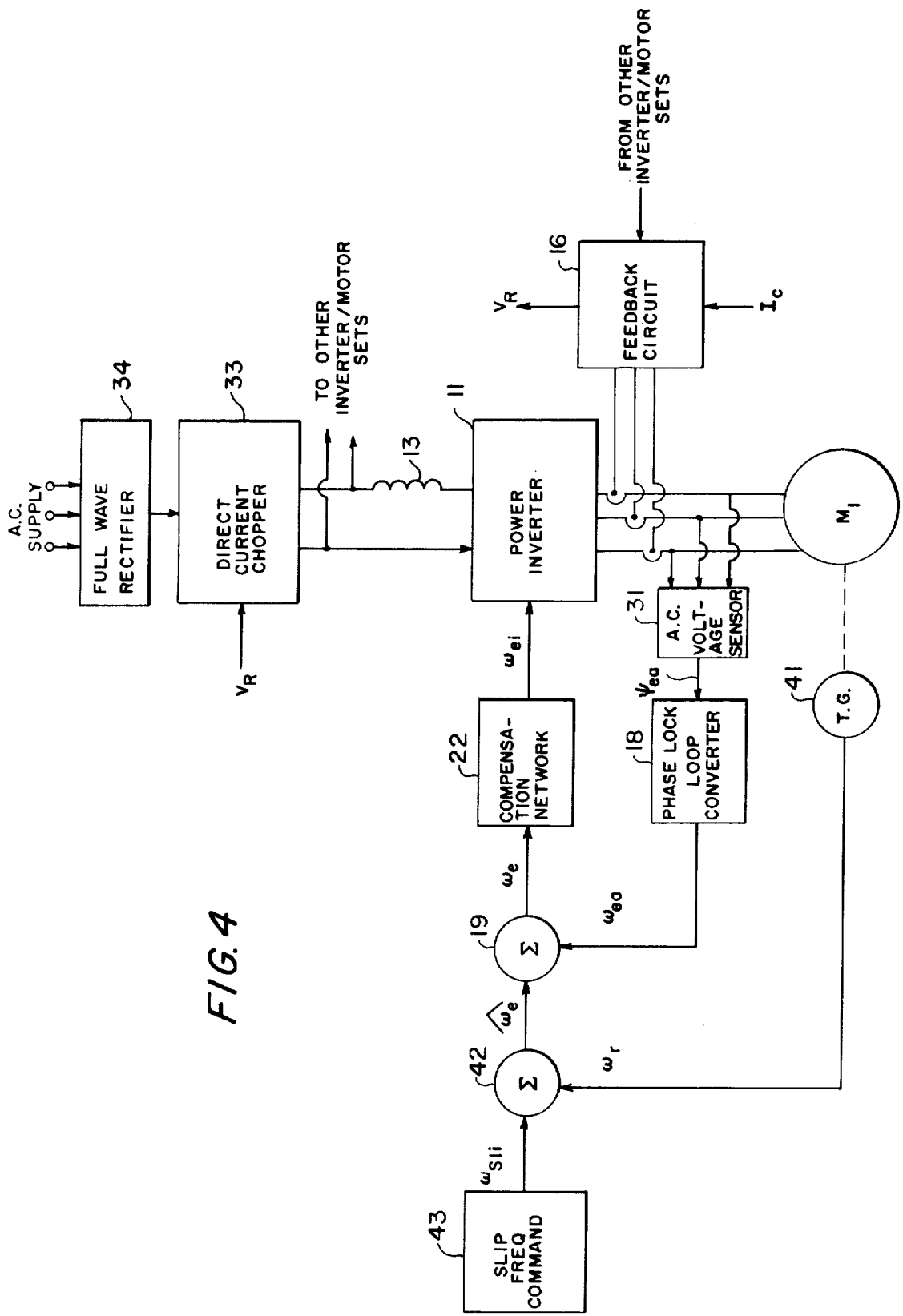
FIG. 4 is a functional block diagram of a modified form of the invention shown in FIG. 3, and wherein an additional speed feedback channel is included to further enhance operation of the system.

FIG. 4 of the drawings is a functional block diagram of a modified form of the system in FIG. 3, and differs therefrom primarily in the fact that an additional speed feedback loop is provided through the medium of the tachometer generator and an additional summing circuit 42. In addition, the system of FIG. 4 employs a somewhat different form of controlled magnitude direct current source for supplying the power inverter 11. The arrangement shown in FIG. 4 comprises a full wave rectifier 34 that is supplied from a conventional source of alternating current and in turn supplies a direct current chopper 33 of conventional construction such as those described in Chapter 13 of the above-noted General Electric SCR Manual. With this arrangement, it is not necessary to employ a phase controlled rectifier, and consequently better A.C. line power factor can be obtained. In all other respects, the system of FIG. 4 will function similarly to that of the system of FIG. 3 but with the additional speed control provided by tachometer generator 41 and second summing circuit 42.

From the foregoing description, it will be appreciated that the present invention provides a new control method and apparatus for reliably controlling the operation of induction motors and the like by closely and more effectively controlling the frequency of the rotating electromagnetic flux produced by the machine while also separately controlling its magnitude. This is achieved by appropriately controlling the input frequency of the alternating current supplied to an alternating current induction motor so as to obtain a desired rotating electromagnetic flux frequency within the motor. To achieve this, in a preferred embodiment of the invention, the actual value of the frequency of the electromagnetic flux produced across the rotor-stator gap of the motor, is sensed and is used as the controlling criteria in the motor control system. The magnitude of the alternating current supplied to the motor then is separately controlled in accordance with some other predetermined criteria such as motor torque, load current, etc.

Having described several embodiments of a new and improved method and apparatus for improved frequency control for alternating current machines, constructed in accordance with the invention, it is believed obvious that other modifications and variations of the invention will be suggested to those skilled in the art in the light of the above teachings. It is therefore to be understood that changes may be made in the particular embodiments of the invention described which are within the full intended scope of the invention as defined by the appended claims.

What is claimed is:

1. In a feedback loop stabilization control system for controlling the operation of power conversion circuit means supplying alternating current electric power to alternating current electric machines of the synchronous or asynchronous type; the improvement comprising machine frequency responsive sensing means for developing an alternating signal having a frequency indicative of the frequency of the rotating electromagnetic flux produced in such a machine, feedback signal deriving means for deriving from said alternating signal a feedback signal having a value that is a measure of the frequency of said alternating signal, and compensating circuit means responsive to the value of said feedback signal for influencing the operation of said power conversion circuit means so as to control the frequency of the alternating current supplied to the machine.

2. A control system according to claim 1 wherein the feedback signal deriving means comprises a phase lock-loop converter.

3. A control system according to claim 1 wherein said compensating circuit means includes summing circuit means having an output supplied to said power conversion circuit means for controlling the frequency of operation thereof, a first input having a command value of machine flux frequency supplied thereto and a second input having said feedback signal representative of the frequency of the rotating electromagnetic flux produced in the machine supplied thereto, the summing circuit serving to derive an output frequency controlling signal for supply to the power conversion apparatus for controlling the frequency of the alternating current supplied to the machine in a manner to minimize any difference between the input command value of machine flux frequency and said feedback signal.

4. A control system according to claim 1 wherein the feedback signal deriving means comprises a phase lock-loop converter for deriving an analog feedback signal representative of the frequency of the rotating electromagnetic flux produced in the machine, and said compensating circuit means includes summing circuit means having an output supplied to said power conversion circuit means for controlling the frequency of operation thereof, a first input having a command value of machine flux frequency supplied thereto and a second input having the analog feedback signal supplied thereto, the summing circuit serving to derive an output frequency controlling signal for supply to the power conversion apparatus for controlling the frequency thereof in a manner to minimize any difference between the input command value of machine flux frequency and the feedback signal.

5. A control system according to claim 4 wherein said compensating circuit means further includes a compensator network interconnected between the output of said summing circuit and the power conversion apparatus for introducing lead-lag compensation and overcoming instabilities otherwise occurring in the system.

6. A control system according to claim 2 wherein said frequency responsive sensing means includes machine flux sensing means and said phase lock-loop converter comprises a phase detector having one input supplied with the alternating signal developed by the machine flux sensing means, a voltage controlled oscillator having its output supplied to a second input of the phase detector with the output of the phase detector supplied to and controlling the voltage controlled oscillator for minimizing any phase difference between the signal supplied to the phase detector from the machine flux sensing means and the output of the voltage controlled oscillator, the feedback signal representative of the frequency of the rotating magnetic flux produced in the machine being derived from the output from the phase detector.

7. A control system according to claim 4 wherein said compensating circuit means further includes a compensator network interconnected between the output of said summing circuit and the power conversion apparatus for introducing lead-lag compensation and overcoming instabilities otherwise occurring in the system, said frequency responsive sensing means includes machine flux sensing means, and said phase lock-loop converter comprises a phase detector having one input supplied with the alternating signal developed by the machine flux sensing means, a voltage controlled oscillator having its output supplied to a second input of the phase detector with the output of the phase detector supplied to and controlling the voltage controlled oscillator for minimizing any phase difference between the signal supplied to the phase detector from the machine flux sensing means and the output of the voltage controlled oscillator and a loop filter interposed between the output of the phase detector and the input of the voltage controlled oscillator, the feedback signal representative of the frequency of the rotating magnetic flux produced in the machine being derived from the loop filter connected to the output from the phase detector.

8. A control system according to claim 1 wherein the frequency responsive sensing means comprises machine flux sensing means for sensing the actual electromagnetic flux produced across the rotor-stator gap of the alternating current machine.

9. A control system according to claim 8 wherein the feedback signal deriving means comprises a phase lock-loop converter.

10. A control system according to claim 9 wherein said compensating circuit means includes summing circuit means having an output supplied to said power conversion circuit means for controlling the frequency of operation thereof, a first input having a command value of machine flux frequency supplied thereto and a second input having the feedback signal representative of the frequency of the rotating electromagnetic flux produced in the machine supplied thereto, the summing circuit serving to derive an output frequency controlling signal for supply to the power conversion apparatus for controlling the frequency thereof in a manner to minimize any difference between the input command value of machine flux frequency and said feedback signal, a compensator network interconnected intermediate the output of said summing circuit and the power conversion apparatus for introducing lead-lag compensation and overcoming instabilities otherwise occurring in the system, and said phase lock-loop converter comprises a phase detector having one input supplied with the alternating signal developed by the machine flux sensing means, a voltage controlled oscillator having its output supplied to a second input of the phase detector with the output of the phase detector supplied through a loop filter to control the voltage controlled oscillator for minimizing any phase difference between the signal supplied to the phase detector from the machine flux sensing means and the output of the voltage controlled oscillator, the feedback signal representative of the frequency of the rotating electromagnetic flux produced in the machine being derived from the output of the phase detector through the loop filter.

11. A control system according to claim 10 wherein the power conversion circuit means comprises an auto-sequential commutated control current inverter supplied from phase controlled rectifier means for supplying controlled magnitude direct current to the auto-sequential communtated controlled current inverter with the compensating circuit means controlling the frequency of operation of the auto-sequential commutated controlled current inverter.

12. A control system according to claim 1 wherein the power conversion circuit means comprises an auto-sequential commutated control current inverter supplied from phase controlled rectifier means for supplying controlled magnitude direct current to the auto-sequential commutated controlled current inverter with the compensating circuit means controlling the frequency of operation of the auto-sequential commutated controlled current inverter.

13. A control system according to claim 11 further including motor speed sensing means for sensing the speed of the rotor of the alternating current machine, additional summing circuit means having the speed signal derived from said motor speed sensing means supplied thereto as one input, and slip frequency command input means suppling an input value of slip frequency to the additional summing circuit means with the output of the additional summing circuit means being supplied to the input of the first mentioned summing circuit comprising a part of said compensating circuit means.

14. A control system according to claim 1 wherein said frequency responsive sensing means senses the frequency of the alternating voltage produced across the stator windings of the alternating current machine.

15. A control system according to claim 14 wherein said compensating circuit means includes summing circuit means having an output supplied to said power conversion circuit means for controlling the frequency of operation thereof, a first input having a command value of machine flux frequency supplied thereto and a second input having the signal representative of the frequency of the rotating electromagnetic flux produced in the machine supplied thereto, the summing circuit serving to derive an output frequency controlling signal for supply to the power conversion apparatus for controlling the frequency thereof in a manner to minimize any difference between the input command value of machine flux frequency and said feedback signal, a compensator network interconnected between the output of said summing circuit and the power conversion apparatus for introducing lead-lag compensation and overcoming instabilities otherwise occurring in the system, and wherein the feedback signal deriving means comprises a phase lock-loop converter that includes a phase detector having one input supplied from the output from the sensing means for sensing the frequency of the alternating voltage produced across the stator windings of the alternating current machine, and a voltage controlled oscillator having its output supplied to a second input of the phase detector with the output of the phase detector supplied to and controlling the voltage controlled oscillator for minimizing any phase difference between the signal supplied to the phase detector from the sensing means and the output of the voltage controlled oscillator, the feedback signal representative of the frequency of the rotating magnetic flux produced in the machine being derived from the output from the phase detector.

16. A control system according to claim 15 wherein the power conversion circuit means comprises an auto-sequential commutated controlled current inverter supplied from direct current chopper circuit means for supplying controlled magnitude direct current to the auto-sequential commutated controlled current inverter with the compensating circuit means controlling the frequency of operation of the auto-sequential commutated controlled current inverter.

17. A control system according to claim 16 further including motor speed sensing means for sensing the speed of the rotor of the alternating current machine, additional summing circuit means having the speed signal derived from said motor speed sensing means supplied thereto as one input, and slip frequency command input means supplying an input value of slip frequency to the additional summing circuit means with the output of the additional summing circuit means being supplied to the input of the first mentioned summing circuit comprising a part of said compensating circuit means.

18. A method for controlling the operation of alternating current machines with auto-sequential commutated controlled current inverters comprising sensing the frequency of the rotating electromagnetic flux produced in the machine, converting the sensed machine flux frequency to a feedback signal representative of the frequency of the rotating electromagnetic flux produced in the machine, combining the feedback signal with an input command value of machine flux frequency signal representative of a desired value of frequency for the rotating electromagnetic flux produced in the machine, and supplying an output error signal representative of the polarity and magnitude of any difference between the command value of machine flux frequency and the measured value of machine flux frequency as represented by the feedback signal to control the frequency of operation of the controlled current inverters in a manner such as to zero the output error signal.

19. A method for controlling alternating current machines according to claim 18 wherein the frequency of the actual rotating electromagnetic flux produced across the stator-rotor of the machine is sensed, converted to a feedback signal and combined with the input command value of machine flux frequency signal to produce the output error signal.

20. A method for controlling alternating current machines according to claim 18 wherein the sensed machine flux frequency signal is converted to a feedback signal by supplying it to a phase detector in conjunction with the input of a voltage controlled oscillator which in conjunction with the phase detector comprises a phase lock-loop converter with the feedback signal being derived from the output of the phase detector.

21. A method for controlling alternating current machines according to claim 20 wherein the frequency of the actual rotating electromagnetic flux produced across the stator-rotor of the machine is sensed, converted to a feedback signal and combined with the input command value of machine flux frequency signal to produce the output error signal.

22. A method for controlling alternating current machines according to claim 20 wherein the frequency of the alternating voltage produced across the stator of the machine is sensed and utilized as the measure of the frequency of the rotating electromagnetic flux produced in the machine.

23. A method for controlling alternating current machines according to claim 18 further including sensing the speed of rotation of the rotor of the machine and deriving a feedback sensing machine speed signal, applying an input command value of slip frequency signal, and combining the input command value of slip frequency signal with the feedback sensed speed signal to derive the command value of machine flux frequency signal representative of a desired value of frequency for the rotating electro-magnetic flux produced in the machine.

24. A method for controlling alternating current machines according to claim 23 wherein the frequency of the actual rotating electro-magnetic flux produced across the stator-rotor of the machine is sensed, converted o an analog voltage feedback signal and combined with the input command value of machine flux frequency signal to produce the output error signal.

25. A method for controlling alternating current machines according to claim 24 wherein the auto-sequential commutated controlled current inverters are supplied with controlled magnitude direct current by phase controlled rectifying input electric power supplied from a conventional commercial or industrial source of alternating current electric power.

26. A method for controlling alternating current machines according to claim 23 wherein the frequency of the alternating voltage produced across the stator of the machine is sensed and utilized as the measure of the frequency of the rotating electromagnetic flux produced in the machine.

27. A method for controlling alternating current machines according to claim 26 wherein the auto-sequential commutated controlled current inverters are supplied with controlled magnitude direct current by rectifying and chopping input electric power supplfied from a conventional commercial or industrial source of alternating current electric power.

28. A method for controlling alternating current machines according to claim 18 wherein the auto-sequential commutated controlled current inverters are supplied with controlled magnitude direct current by phase controlled rectifying input electric power supplied from a conventional commerical or industrial source of alternating current electric power.

29. A method for controlling alternating current machines according to claim 18 wherein the auto-sequential commutated controlled current inverters are supplied with controlled magnitude direct current by rectifying and chopping input electric power supplied from a conventional commercial or industrial source of alternating current electric power.

30. A method for controlling alternating current machines according to claim 18 wherein the auto-sequential commutated controlled current inverters are supplied with controlled magnitude direct current by chopping input direct current electric power supplied from a direct current electric power source.

* * * * *